United States Patent Office 3,817,888
Patented June 18, 1974

3,817,888
ABS POLYMER COMPOSITIONS
Wallace D. Johnson, Bartlesville, Okla., assignor to Phillips Petroleum Company
No Drawing. Filed Apr. 3, 1972, Ser. No. 240,837
Int. Cl. C08d 9/14
U.S. Cl. 260—23.7 N                 8 Claims

ABSTRACT OF THE DISCLOSURE

Malodor of mercaptan-modified acrylonitrile-butadiene-styrene resin compositions is reduced by incorporating into such compositions certain metal salts.

---

This invention relates to improved ABS polymer compositions. More particularly, this invention relates to mercaptan-modified ABS polymer compositions having reduced malodor.

The ABS (acrylonitrile-butadiene-styrene) family of resins constitutes an extremely versatile group of engineering thermoplasttic materials which find many applications because of their toughness and impact strength even though certain other properties may not be as good as desired. Generally, such ABS polymeric materials will contain from 5 to 35 percent acrylonitrile, about 5 to 35 percent butadiene, and about 40 to 90 percent styrene, based on the entire ABS polymer as 100 percent. The ability to vary the acrylonitrile, butadiene, and styrene content contributes to the unique versatility of these thermoplastic materials.

The ABS polymer may be prepared by what is known as a graft polymerization process, which in accordance with known practice is carried out by polymerizing a mixture of acrylonitrile and styrene monomers in the presence of a previously prepared polybutadiene latex or butadiene copolymer rubber latex, under such conditions that an appreciable portion of the acrylonitrile and styrene monomers becomes grafted or polymerized directly on the polybutadiene molecules, to make a new polymeric material which is commonly referred to as an ABS polymer. The butadiene portion, sometimes called the base or backbone of the ABS graft polymer, is rubbery while the acrylonitrile-styrene (the grafted comonomers) portion of the grafted polymer molecule is resinous. In practice, it is frequently desirable to add to such graft copolymer an additional quantity of separately prepared resin, e.g., styrene-acrylonitrile resin, with or without additional separately prepared butadiene-acrylonitrile copolymer rubber. A convenient way of blending these various polymeric materials is to blend or mix them in latex form, and thereafter coprecipitate or coagulate them to yield the desired mixture. However, the polymeric material may also be blended in solid form if desired.

Other methods may be employed to produce the graft copolymer. For example, a suspension polymerization technique may be utilized wherein the rubbery polymer is dissolved in a mixture of the monomers, i.e., acrylonitrile and styrene. The resulting solution is then suspended as essentially spherical droplets in water and the droplets are polymerized to form solid polymeric beads. Alternatively, solution polymerization can be effected wherein the rubber and grafting monomers are dissolved in a suitable solvent and then polymerized. Mass or bulk polymerization is also suitable, e.g., by adding the rubber and grafting monomers to a reactor having a high heat transfer surface such as an extruder and then polymerizing the monomers.

In place of some or all of the graft copolymer, one can employ, as the ABS polymer, a physical blend (as distinguished from a chemically united graft copolymer) of separately prepared acrylonitrile-styrene resin and butadiene-acrylonitrile rubber, in such proportions as to yield the desired overall percentages of acrylonitrile, butadiene, and styrene previously specified.

Typical of the graft copolymers commonly referred to as ABS resins are those described in U.S. Pat. 2,820,773. Typical of such polymers in the form of actual physical blends of rubber and resinous polymers are those described in U.S. Pats. 2,2439,202 and 2,600,024.

For many applications, control of the acrylonitrile, butadiene, and styrene content alone does not always succeed in providing a polymeric material having the desired characteristics. Thus, it has been necessary to develop complementing methods of modifying these ABS polymers.

A contributing factor to the great versatility of the ABS family of resins is found by their ready response to modification to enhance one or more properties without great detriment to other properties, even though other properties might be somewhat compromised. In addition to the control of acrylonitrile, butadiene, and styrene content, one of the most widely used methods of controlling primarily the processing properties of ABS polymers is the use of chain transfer agents to control the molecular weight and the degree of polymerization in the grafting step.

Generally, the most effective of the chain transfer agents have been mercaptan compounds such as lauryl mercaptan and a tertiary octyl mercaptan. The use of the mercaptans as chain transfer agents to regulate the molecular weight has been effective in providing improved processing ABS polymers. However, such mercaptan-modified ABS polymers exhibit a disagreeable odor characteristic of many sulfur-containing compounds. Attempts to overcome the malodorous property have included the use of masking agents which substitute a presumably less offensive odor for the original malodor. Along with the added expense, another disadvantage of such an approach is that the resulting odor may still be objectionable, albeit for other reasons. Thus, there is a continuing search for means of improving the odor of ABS resins, particularly in the case of mercaptan-modified resins.

It is an object of this invention to provide mercaptan-modified ABS polymer compositions having reduced malodor.

It is another object of this invention to provide a method for reducing the malodor of mercaptan-modified ABS polymer compositions.

Other objects, aspects, and advantages of the invention will be readily apparent to those skilled in the art upon a reading of the specification and appended claims.

In accordance with this invention it has now been discovered that the malodor of mercaptan-modified acrylonitrile-butadiene-styrene resin compositions can be substantially reduced by incorporating into such compositions certain metal salts of an inorganic and organic nature.

More particularly, the present invention provides mercaptan-modified acrylonitrile-butadiene-styrene polymeric compositions having reduced malodor. Such ABS compositions are provided by the method which comprises adding to such compositions an odor-reducing amount of at least one of certain selected organic and inorganic salts of metals from Groups 1b, 2a, and 2b of the Periodic Table as given in the "Handbook of Chemistry and Physics," Chemical Rubber Company, 46th Edition (1965), p. B-3.

The metal salts which can be used in the practice of the invention comprise at least one of a Group 1b metal halide, nitrate or salt of a monocarboxylic aliphatic acid having from 8 to 24 carbon atoms; a Group 2a metal halide, nitrate or salt of a monocarboxylic aliphatic acid having from 8 to 24 carbon atoms; or a Group 2b metal halide, nitrate or salt of a monocarboxylic aliphatic acid having from 8 to 24 carbon atoms. Particularly preferred additives include the Groups 1b, 2a and 2b metal salts of monocarboxylic acids and the Groups 2a and 2b metal halides, in particular the chlorides of such metals.

Representative compounds include barium chloride, barium stearate, cadmium chloride, cadmium stearate, zinc chloride, and zinc stearate. Particularly preferred are the Group 2a halides and salts of monocarboxylic acids, in particular such acids having from 16 to 24 carbon atoms.

In general, the malodor-reducing additives of this invention will be used in an amount sufficient to at least reduce, if not eliminate entirely, the malodor of mercaptan-modified ABS polymers which can be attributed to the mercaptan residues. Generally, the total amount of such additives will be in the range of about 0.01 to about 0.5 part of additive per 100 parts of ABS polymer, and will preferably be in the range of about 0.05 to about 0.3 phr., i.e., parts of additive per 100 parts of resin.

In practicing the invention, the odor-reducing additives of the present invention can be admixed with the ABS polymer by any of the presently known methods for obtaining the homogeneous dispersion or solution of an additive into a polymeric material. In a particularly approved method, the metal salts can be dry blended with ABS polymer in the form of beads or extruded pellets and the dry blend is then hot mixed in a Brabender plastograph. The actual point at which the odor-reducing additives of the present invention are added to the polymers is not critical; that is, the benefits of this invention are obtained whether the additives are added during the actual course of polymerization, or are added subsequently during the compounding operations. Of course, other desired appropriate ingredients, e.g., antioxidants, plasticizers, pigments, fillers, and the like, may be included in the compositions in a conventional manner.

The following example will further illustrate the invention.

EXAMPLE I

Preparation of graft copolymer

A mixture of 60 parts of styrene and 25 parts of acrylonitrile was suspension polymerized in the presence of 15 parts of a butadiene/styrene (75/25) block copolymer having a block polystyrene content of about 18 weight percent and a Mooney viscosity (ML-4 at 212° F.) of about 47 according to the following recipe:

| Ingredients: | Parts by weight per 100 parts by weight of Solution A |
|---|---|
| Solution A: | |
| Styrene | 60 |
| Acrylonitrile | 25 |
| Butadiene/styrene copolymer | 15 |
| Mercaptan modifier | 0.45 |
| t-Butyl peroctoate | 0.3 |
| Bis-($\alpha,\alpha$-dimethylbenzyl) peroxide | 0.1 |
| Ionol/DLTDP/Polygard (3/5/7) [1] | 1.0 |
| Solution B: | |
| Water | 300 |
| $Na_3PO_4 \cdot 12H_2O$ | 2.8 |
| $CaCl_2 \cdot 2H_2O$ | 2.0 |
| Sodium octyl sulfate | 0.28 |

[1] An antioxidant mixture of the respective weight ratio shown. Ionol is 2,6-di-t-butyl-4-methylphenol. DLTDP is dilauryl thiodipropionate. Polygard is tris(nonyl-phenyl)phosphite.

In the above recipe, Solutions A and B are separately prepared. Solution A can be called the "cement" or rubber solution, while Solution B is the aqueous suspending medium. To the reactor containing Solution B, the proper amount of Solution A was added. The vapor space was purged with nitrogen and the reaction mixture agitated and then brought to polymerization temperature. After polymerization for the desired time (8–16 hours) at 80° C., the slurry of polymer beads was acidified with hydrochloric acid and the beads recovered by filtration. The filtered beads were washed with water and dried overnight in a vacuum oven at 80° C.

Incorporation of odor-reducing additives

The graft copolymers prepared as described above were divided into several portions. A series of samples was prepared by blending 0.1 part by weight of a number of inorganic metal salts and organic metal salts with 100 parts by weight of ABS polymer and then hot mixing the dry blend in an internal mixer at 210° C.

The samples were prepared for odor testing as follows:

Approximately 5 grams of the ABS resin to be tested were pressed at 350° F. into a film 0.02 inch thick, which was then cut into strips 1/16 to 1/8 inch by 1¾ inch. The strips were placed in 4-dram screw-cap vials.

Each of the test samples was evaluated by an odor panel consisting of at least three judges. Each of the members of any individual panel was given a test sample and a control sample, i.e., mercaptan-modified ABS polymer containing no additive. The judges were asked to compare the two samples as to their personal preference with regard to intensity and quality of odor. When the judges' preferences were unanimous or nearly so for a pair of samples (C and D), this order was accepted and recorded as C>D or vice versa (the odor of C was better than that of D). However, when considerable disagreement existed between the judges or when no differences were detected, the observation was recorded as C≧D or C~D (the odor of C was better than or equal to that of D or the odor of C was approximately the same as the odor of D, respectively). The results of the odor test were reported in Table I.

TABLE I

Odor of ABS with metal salts (0.1 part)

Improved odor:
    Barium chloride
    Barium stearate
    Cadmium chloride
    Cadmium stearate
    Zinc chloride
    Zinc stearate
    Cupric chloride Did not improve odor:
    Aluminum chloride
    Aluminum hydroxide
    Aluminum stearate
    Cobaltous chloride
    Cobalt naphthenate
    Lead chloride
    Lead stearate
    Manganous chloride
    Nickel acetylacetonate
    Nickel stearate
    Nickel chloride
    Potassium ferricyanide
    Stannous chloride
    Zinc oxide The foregoing test data demonstrate that the malodor of the mercaptan-modified ABS polymers is improved by the practice of the present invention.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A method for reducing malodor of mercaptan-modified acrylonitrile-butadiene-styrene polymeric compositions containing from 5 to 35 percent acrylonitrile, 5 to 35 percent butadiene and 40 to 90 percent styrene which comprises adding to such compositions an odor-reducing amount of at least one odor-reducing compound selected from the group consisting of barium chloride, cadmium chloride, cupric chloride, zinc chloride, barium stearate, cadmium stearate and zinc stearate.

2. The method of claim 1 wherein the amount of said odor-reducing compound is in the range of about 0.01 to about 0.5 part by weight per 100 parts by weight of the acrylonitrile-butadiene-styrene polymer.

3. The method of claim 2 wherein the amount of said odor-reducing compound is in the range of about 0.05 to about 0.3 part by weight per 100 parts by weight of said polymer.

4. The method of claim 3 wherein the amount of said odor-reducing compound is 0.1 part by weight per 100 parts of said polymer.

5. A composition of matter comprising a mercaptan-modified acrylonitrile-butadiene-styrene polymeric material containing an odor-reducing amount of cadmium stearate.

6. A composition of matter according to claim 5 wherein the amount of said cadmium stearate is in the range of about 0.01 to about 0.5 part by weight per 100 parts of acrylonitrile-butadiene-styrene polymeric material.

7. A composition of matter according to claim 6 wherein the amount of said cadmium stearate is in the range of about 0.05 to about 0.3 part by weight per 100 parts by weight of said polymer.

8. A composition of matter according to claim 7 wherein the amount of said cadmium stearate is 0.1 part by weight per 100 parts by weight of said polymer.

References Cited

UNITED STATES PATENTS

| | | | |
|---|---|---|---|
| 2,755,270 | 7/1956 | Hayes | 260—880 R |
| 2,745,818 | 5/1956 | Tegrotenhuis | 260—880 R |
| 2,702,284 | 2/1955 | Brock | 260—880 R |
| 3,644,244 | 2/1972 | Fryd et al. | 260—23 R |
| 3,567,669 | 3/1971 | Georgiana | 260—23.7 R |
| 3,677,942 | 7/1972 | Lictard et al. | 260—23.7 R |
| 3,502,744 | 3/1970 | Weitzel et al. | 260—23.7 R |
| 2,820,773 | 1/1958 | Childers et al. | 260—880 R |
| 3,177,268 | 4/1965 | Frazer et al. | 260—23.7 R |
| 3,268,332 | 8/1966 | Caruso et al. | 260—23.7 R |

MAURICE J. WELSH, Jr., Primary Examiner

U.S. Cl. X.R.

260—880 R, 893